US012583199B2

(12) United States Patent
Cheich et al.

(10) Patent No.: US 12,583,199 B2
(45) Date of Patent: Mar. 24, 2026

(54) MACHINE AND METHOD FOR PRODUCING DUNNAGE HAVING AN X-SHAPED CROSS-SECTION PROFILE

(71) Applicant: Ranpak Corp., Concord Township, OH (US)

(72) Inventors: Robert C. Cheich, Independence, OH (US); Steven Toneff, Painesville, OH (US)

(73) Assignee: Ranpak Corp., Concord Township, OH (US)

( * ) Notice: Subject to any disclaimer, the term of this patent is extended or adjusted under 35 U.S.C. 154(b) by 44 days.

(21) Appl. No.: 17/479,793

(22) Filed: Sep. 20, 2021

(65) Prior Publication Data

US 2022/0001639 A1 Jan. 6, 2022

Related U.S. Application Data

(62) Division of application No. 15/308,227, filed as application No. PCT/US2015/028871 on May 1, 2015, now Pat. No. 11,123,943.

(Continued)

(51) Int. Cl.
*B31D 5/00* (2017.01)

(52) U.S. Cl.
CPC .... *B31D 5/0047* (2013.01); *B31D 2205/0023* (2013.01); *B31D 2205/0047* (2013.01)

(58) Field of Classification Search
CPC .......... B31D 5/0047; B31D 2205/0023; B31D 2205/0047; B31D 5/0039; B31D 2205/0005; B31D 5/0043; B31D 5/006

(Continued)

(56) References Cited

U.S. PATENT DOCUMENTS 3,051,604 A * 8/1962 Andrews ................ B31D 1/021 156/152
3,655,500 A * 4/1972 Johnson ............... B31D 5/0047 217/53

(Continued)

FOREIGN PATENT DOCUMENTS

EP 0781201 B1 2/1998
EP 2743071 B1 10/2016

(Continued)

OTHER PUBLICATIONS

International Search Report and Written Opinion mailed Jul. 10, 2015, for corresponding International Patent Application No. PCT/US2015/028871.

*Primary Examiner* — Sameh Tawfik
(74) *Attorney, Agent, or Firm* — Renner, Otto, Boisselle & Sklar, LLP

(57) ABSTRACT

A dunnage conversion machine includes a bunching assembly that randomly crumples at least two plies of sheet stock material into modified plies having a relatively thicker three-dimensional shape, and a feeding assembly that advances and connects together longitudinally-extending portions of the modified plies to form a dunnage strip. A diverter minimizes overlap of and encourages separation of lateral edges of the modified plies from one another, and a severing assembly severs distinct dunnage products from the strip. An exemplary resultant dunnage product includes two or more plies of crumpled sheet material interconnected along a longitudinally-extending portion having interconnected overlapped portions of each of the plies and a longitudinally-extending line of connection. Each ply may extend laterally outwardly along randomly crumpled edge portions having a crumpled lateral width greater than a lateral width of the longitudinally-extending portion, the (Continued)

edge portions extending from the line of connection to opposed, laterally-extending free edges.

8 Claims, 18 Drawing Sheets

Related U.S. Application Data

(60) Provisional application No. 61/987,417, filed on May 1, 2014.

(58) Field of Classification Search
USPC .......................................................... 493/346
See application file for complete search history.

(56) References Cited

U.S. PATENT DOCUMENTS

| | | | | | |
|---|---|---|---|---|---|
| 3,799,039 | A * | 3/1974 | Johnson | B31D 5/0047 | 493/464 |
| 4,839,210 | A * | 6/1989 | Komaransky | B31D 5/0047 | 206/412 |
| 5,203,761 | A * | 4/1993 | Reichental | B31D 5/006 | 493/346 |
| 6,135,939 | A | 10/2000 | Lencoski et al. | | |
| 6,190,299 | B1 | 2/2001 | Simmons | | |
| 9,688,044 | B2 | 6/2017 | Deis et al. | | |
| 2009/0082187 | A1* | 3/2009 | Cheich | B31D 5/0052 | 53/472 |
| 2014/0162024 | A1* | 6/2014 | Deis | B65D 81/127 | 493/464 |

FOREIGN PATENT DOCUMENTS

| | | | |
|---|---|---|---|
| JP | H10502586 | A | 3/1998 |
| JP | H10502588 | A | 3/1998 |
| JP | 2010540286 | A | 12/2010 |
| JP | 2013067428 | A | 4/2013 |
| WO | 96/01731 | A1 | 1/1996 |
| WO | 2006/052980 | A2 | 5/2006 |
| WO | 2009/042664 | A2 | 4/2009 |

* cited by examiner

MACHINE AND METHOD FOR PRODUCING DUNNAGE HAVING AN X-SHAPED CROSS-SECTION PROFILE

This application is a divisional and claims priority of U.S. patent application Ser. No. 15/308,227, filed 1 Nov. 2016, which claims priority to Patent Cooperation Treaty Application No. PCT/US2015/028871 filed 1 May 2015, which claims priority of U.S. Provisional Patent Application No. 61/987,417, filed 1 May 2014, the entire disclosures of which are hereby incorporated by reference.

FIELD OF THE INVENTION

The present invention relates to dunnage conversion machines, and more particularly to machines and methods for converting a sheet stock material into a relatively less dense dunnage product.

BACKGROUND

Various types of conversion machines have been used to convert sheet stock material into a dunnage product. Some machines produce a void-fill dunnage product, used primarily to fill voids in a packaging container to prevent the contents from shifting during shipment. One objective in the design of these machines is to produce the void-fill dunnage product very rapidly. Accordingly, these machines are designed to operate at relatively high speeds.

Other conversion machines produce a dunnage product having cushioning characteristics that may not otherwise be obtainable from a void-fill dunnage product. These cushioning characteristics enable the dunnage product to cushion or secure one or more articles in a container and to protect the one or more articles from damage. Such cushioning conversion machines usually produce the dunnage product at a comparatively slower speed than void-fill-producing conversion machines, the slower speed enabling the machines to deform or otherwise shape the sheet stock material to impart adequate loft into the resulting dunnage product and to ensure that it holds its shape. Thus, speed is often sacrificed to achieve a dunnage product characterized by substantial cushioning properties.

Other than speed, some conversion machines are designed to provide a minimal machine footprint for operating in space-constrained packaging facilities or packaging areas of packaging facilities. Due to the concern for saving space, these machines often use relatively narrower sheet stock material for conversion into a dunnage product. Such a dunnage product may take twice as long to fill a container as compared to a dunnage conversion machine having both a relatively larger footprint and the ability to use a wider sheet stock material.

SUMMARY

While many dunnage conversion machines produce an adequate dunnage product, existing dunnage conversion machines and dunnage products might not be ideal for all applications. The present invention provides an improved dunnage conversion machine that is compact, easy to load, and produces an improved dunnage product with better cushioning properties than previous converted void-fill products, at a relatively faster rate than previous cushioning pad-producing conversion machines.

More specifically, the present invention provides a dunnage conversion machine that includes a bunching assembly to shape plies of sheet stock material into modified plies having three-dimensional shapes, and a feeding assembly to advance and connect together longitudinally-extending portions of the modified plies to form a strip of dunnage. The conversion machine may further include a diverter to prevent overlap of and to maintain separation of laterally-extending free edges of the plies during the conversion process.

The resulting strip of dunnage has two or more plies of sheet stock material in an interconnected configuration and has a longitudinally-extending portion including a longitudinally-extending line of connection having interconnected overlapping portions of each of the plies. Each ply has randomly crumpled edge portions that extend laterally outwardly along from the line of connection to opposed, laterally-extending free edges of the edge portions. The free edges of each ply are separated from the free edges of the other plies. Each of the crumpled edge portions of each ply has a crumpled lateral width greater than a lateral width of the longitudinally-extending portion.

According to one aspect of the invention, a machine for converting a sheet stock material into a relatively lower density dunnage product includes a bunching assembly configured to randomly crumple each ply into a three-dimensional modified ply, each ply being crumpled separately. A feeding assembly downstream of the bunching assembly has a pair of opposed members arranged to advance the modified plies between the opposed members and to connect together longitudinally-extending overlapped portions of the modified plies to form a dunnage strip having a line of connection spaced from at least one edge of one of the modified plies.

The bunching assembly may define separate paths for each ply.

The machine may further include opposed diverters, each diverter extending at least partially between an inlet and an outlet of each respective converging chute and along the respective separate path.

The machine may further include opposed diverters disposed upstream of the opposed members for minimizing overlap of free edges of the plies advancing along respective separate paths.

The diverters may extend along inner respective surfaces of opposed outer walls of the converging chutes.

The machine may further include a diverter extending through at least a portion of the bunching assembly to minimize overlap of a laterally-extending free edge of one of the plies with another laterally-extending free edge of the one of the plies.

The bunching assembly may include walls that converge from an inlet at an upstream end of the bunching assembly to an outlet at a downstream end of the bunching assembly.

The bunching assembly may include at least two converging chutes that define respective separate paths for each ply.

The inlet may have a larger area as compared to the outlet.

The machine may include multiple plies of sheet stock material, and the bunching assembly may define paths through which each ply is separately inwardly gathered, a downstream width of the paths being narrower than the initial width of the plies.

At least one of the pair of opposed members may include an axial slitting segment to slit and displace portions of the modified plies out of a planar configuration to form at least one row of tabs to interconnect the overlapped portions of the modified plies, thereby forming the line of connection.

The pair of opposed members may include segmented gears cooperative to advance and connect the modified plies.

The pair of opposed members may include gears interlacing with one another to advance and connect the modified plies therebetween, the gears including axially-spaced segments.

The pair of opposed members may include gears, each gear including a plurality of circumferentially spaced-apart teeth extending from a gear center, the spaced-apart teeth defining spaces therebetween, with the gears being rotatable about respective axes and positioned so that the plurality of teeth of one gear are interlaced sequentially with the plurality of teeth of the other gear as the gears rotate.

The gears may include axially-spaced segments rotatably offset from one another.

Only one member of the pair of opposed members may be driven, and interengagement between the members may drive rotation of the other member.

The machine may further include a diverter adjacent the opposed members to encourage separation of a crumpled laterally-extending free edge of one of the plies from another crumpled laterally-extending free edge of the one of the plies.

The machine may further include an output chute downstream of the opposed members that circumferentially constrains the dunnage strip.

The machine may further include a severing assembly downstream of the opposed members to sever distinct dunnage products from the dunnage strip.

The machine may include a stock supply assembly configured to store at least one supply of sheet stock material and to guide the stock material to the bunching assembly.

The machine may include with guide rollers upstream of the bunching assembly, the guide rollers guiding each ply to its separate path through the bunching assembly.

According to another aspect of the invention, a machine for converting plies of sheet stock material into a relatively lower density dunnage product includes a bunching assembly defining separate paths to separately randomly crumple each ply into a three-dimensional modified ply having a reduced width and increased thickness as compared to the respective uncrumpled ply from which it is formed. A feeding assembly downstream of the bunching assembly has a pair of opposed gears arranged to advance and to connect together longitudinally-extending overlapped portions of the modified plies, thereby forming a dunnage strip having a longitudinally-extending line of connection spaced from laterally-extending longitudinally-coextensive edges of the connected modified plies. A diverter is disposed adjacent the opposed gears to maintain separation of the crumpled edges of the modified plies or of the dunnage strip, and an output chute downstream of the feeding assembly circumferentially constrains the dunnage strip.

According to yet another aspect of the invention, a method of converting sheet stock material into a dunnage product includes the steps of (i) separately randomly crumpling multiple generally planar plies of sheet stock material to form modified plies, each modified ply having a generally three-dimensional shape and laterally-extending crumpled edge portions, (ii) advancing the plies of sheet stock material along separate respective paths, and (iii) connecting the modified plies together along longitudinal portions thereof, after each ply has been converted into the generally three-dimensional shape, to form a dunnage strip.

The separately randomly crumpling step may include drawing each of the generally planar plies through a separate chute having converging side walls.

The method may further include the step of minimizing overlap of a laterally-extending free edge of one of the plies with another laterally-extending free edge of the one of the plies.

The advancing step may include drawing the sheet of material between rotating opposed members.

The connecting step may include slitting and displacing portions of the modified plies out of a planar configuration, thereby forming a longitudinally-extending line of connection spaced from the crumpled edges of the modified plies.

The method may further include the step of encouraging separation of a crumpled laterally-extending free edge of one of the plies from another crumpled laterally-extending free edge of the one of the plies.

The encouraging separation step may include drawing the crumpled edge portions of the dunnage strip into engagement about a diverter adjacent the rotating opposed members.

The method may further include the step of circumferentially constraining the crumpled edge portions of the dunnage strip after the connecting step.

The method may further include the step of separating distinct dunnage products from the dunnage strip.

According to still another aspect of the invention, a dunnage product includes two or more plies of sheet stock material in an interconnected configuration including a longitudinally-extending portion having interconnected overlapped portions of each of the plies and along a longitudinally-extending line of connection. Each ply extends laterally outwardly along randomly crumpled edge portions from the line of connection to opposed, laterally-extending free edges of the edge portions, the free edges of each ply being separated from the free edges of the other plies. Each of the crumpled edge portions of each ply has a crumpled lateral width greater than a lateral width of the longitudinally-extending portion.

The line of connection may include slits extending through the overlapped portions of each of the plies, and portions between the slits being displaced for interconnecting the overlapped portions.

The slits may be spaced apart periodically and longitudinally, and are aligned in two parallel rows, thereby forming tabs in between, the tabs being displaced out of a generally planar configuration of the line of connection.

The dunnage product may further include tabs being displaced out of a generally planar configuration of the line of connection, the displacement of the tabs holding the sheet stock material in its interconnected configuration.

The tabs may be alternately displaced in opposed directions about a central plane generally extending through the line of connection.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

The present invention provides an improved dunnage conversion machine that is compact, easy to load, and produces an improved dunnage product with better cushioning properties than dunnage from previous void-fill conversion machines, at a relatively faster rate than previous cushioning-pad-producing conversion machines Generally, the present invention provides a dunnage conversion system and method for converting a sheet stock supply into a relatively less dense dunnage product. Particularly, the conversion system is capable of making, and the method provides, dunnage products having two or more plies of sheet stock material in an interconnected configuration. The interconnected configuration has a longitudinally-extending line of connection with interconnected overlapping portions of each of the plies. The interconnected configuration also includes longitudinally-coextensive, laterally-extending, edge portions disposed adjacent the line of connection that are randomly crumpled and generally separated from one another outside of the line of connection.

Figure 1:
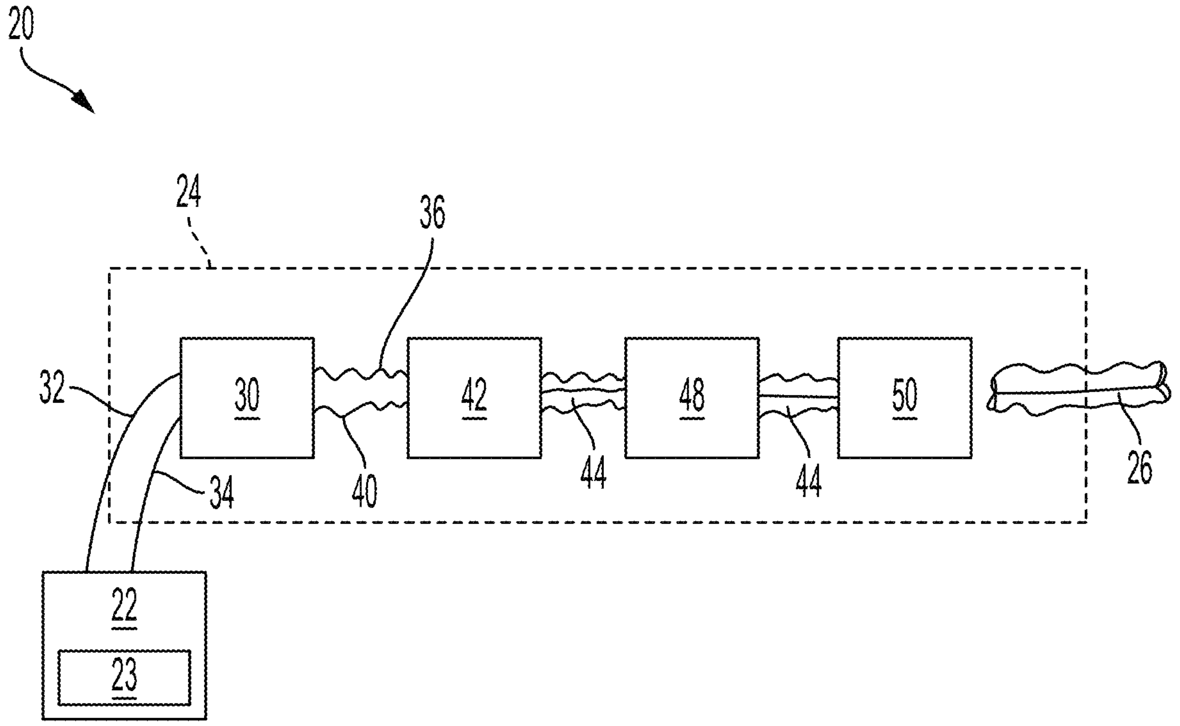
FIG. 1 is a schematic representation of an exemplary dunnage conversion system provided in accordance with the present invention.

Referring now to the drawings in detail, and initially to FIG. 1, an exemplary dunnage conversion system 20 includes a stock supply assembly 22 having a supply of sheet stock material 23. The conversion system 20 also includes a conversion machine 24 that converts the sheet stock material 23 into separate dunnage products 26. The conversion machine 24 includes a bunching assembly 30, to receive and randomly crumple multiple plies 32 and 34 of sheet stock material 23 to form respective modified plies 36 and 40. The conversion machine 24 also includes a feeding assembly 42, to advance and connect together the modified plies 36 and 40 to form a generally continuous dunnage strip 44. The conversion machine 24 further includes an output chute 48, defining a path to guide the dunnage strip 44 away from the machine 24 while circumferentially constraining the dunnage strip 44, and a severing assembly 50, to sever discrete distinct dunnage products 26 from the dunnage strip 44. Although the severing assembly 50 is illustrated as being disposed after the output chute 48, the severing assembly 50 alternatively could be disposed elsewhere before or after the feeding assembly 42, such as between the feeding assembly 42 and the output chute 48. The dunnage products 26 are unique X-shaped dunnage products, i.e. dunnage products 26 having an X-shaped cross-sectional profile that provides improved cushioning properties over traditional void-fill dunnage while using minimal sheet stock material 23.

The conversion machine 24 provided by the present invention is relatively compact as compared to conventional cushioning conversion machines. The conversion machine 24 also is faster than conventional conversion machines that produce cushioning pads. Further, the conversion machine 24 is relatively smaller, has a reduced footprint, and is relatively easily moved about in comparison to conventional cushioning dunnage conversion machines.

The stock supply assembly 22 provided by the invention includes one or more supplies of sheet stock material 23, which may be arranged on a stand, a cart, or simply supported adjacent the conversion machine 24. Suitable supplies of sheet stock material include paper, plastic sheets, or sheets of a combination thereof, and can be supplied as a roll or a fan-folded stack. The sheet stock material also may be laminated or may include a combination of laminated and non-laminated sheet material. Multiple rolls or stacks may be used to provide the multiple sheets or webs of stock material for conversion into the multi-ply dunnage product 26. Alternatively, a single roll may include multiple plies co-wrapped into the single roll or a single stack may include multiple plies co-folded into the single stack. An exemplary sheet stock material for use with the conversion machine 24 includes either a single-ply or multi-ply kraft paper provided either in roll form or as a series of connected, generally rectangular pages in a fan-folded stack. Suitable kraft paper may have various basis weights, such as twenty-pound or forty-pound, for example, and respective plies may have different basis weights.

The stock supply assembly 22 also includes one or more constant entry guides, such as entry guide rollers, not specifically shown, for guiding the plies 32 and 34 of the sheet material 23 from the stock supply assembly 22 to the conversion machine 24. Exemplary constant entry rollers are shown in U.S. Pat. No. 7,041,043 assigned to Ranpak Corp. of Concord Township, Ohio. Further rollers may be provided to guide respective plies of sheet stock material 23 into the machine 24. The entry rollers may be arranged to encourage separation of the plies, to reduce tearing of the sheet material 23, to reduce the advancing force necessary to advance the sheet material 23, to provide more uniform tension on the sheet material 23, or a combination thereof, thereby enabling efficient transfer of the sheet material 23 from the stock supply to the conversion machine 24. The entry rollers also may allow a constant entry angle for each ply 32 and 34 of sheet material 23 as it enters the bunching assembly 30, providing a relatively consistent quality of random crumpling in the modified plies 36 and 40.

As shown, the stock supply assembly 22 is separate from the conversion machine 24, though it may be integral with the machine 24. The sheet material 23 advances from the stock supply assembly 22 to the conversion machine 24. As shown, the stock supply assembly 22 is located upstream of the conversion machine 24, and thus the conversion machine 24 is located downstream of the stock supply assembly 22. As used herein, the downstream direction is the direction of advancement of the plies 32 and 34 of sheet material 23 as they are drawn from the stock supply assembly 22 through the conversion machine 24 and converted into a relatively less dense dunnage product. The upstream direction is thus the direction opposite the direction of advancement of the plies of sheet material 23, from an output of the conversion machine 24 back toward the stock supply assembly 22.

Figure 2:
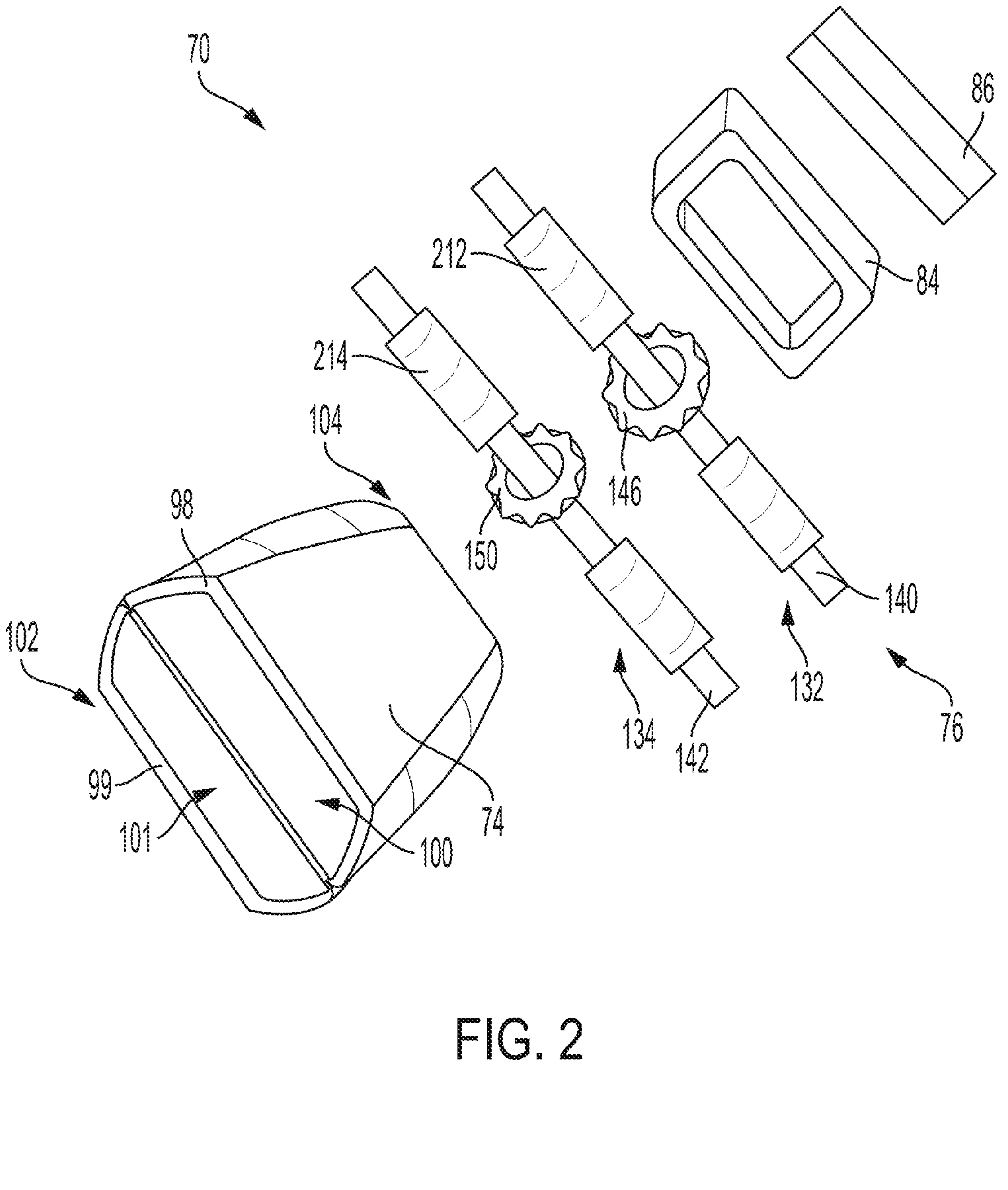
FIG. 2 is a schematic perspective view of operative elements of an exemplary dunnage conversion machine provided in accordance with the present invention.
Figure 3:
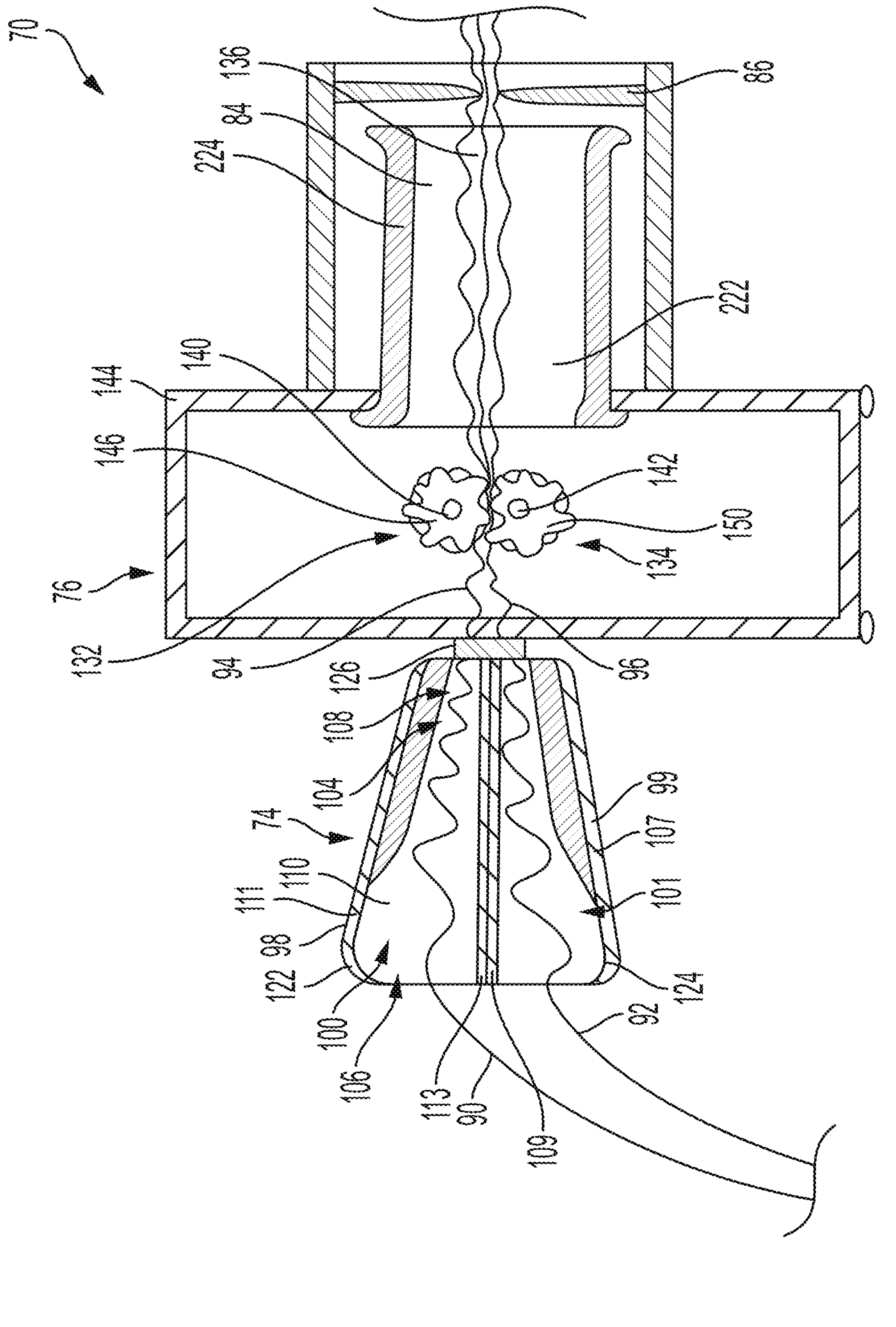
FIG. 3 is a schematic cross-sectional view of a dunnage conversion machine provided in accordance with the invention.
Figure 4:
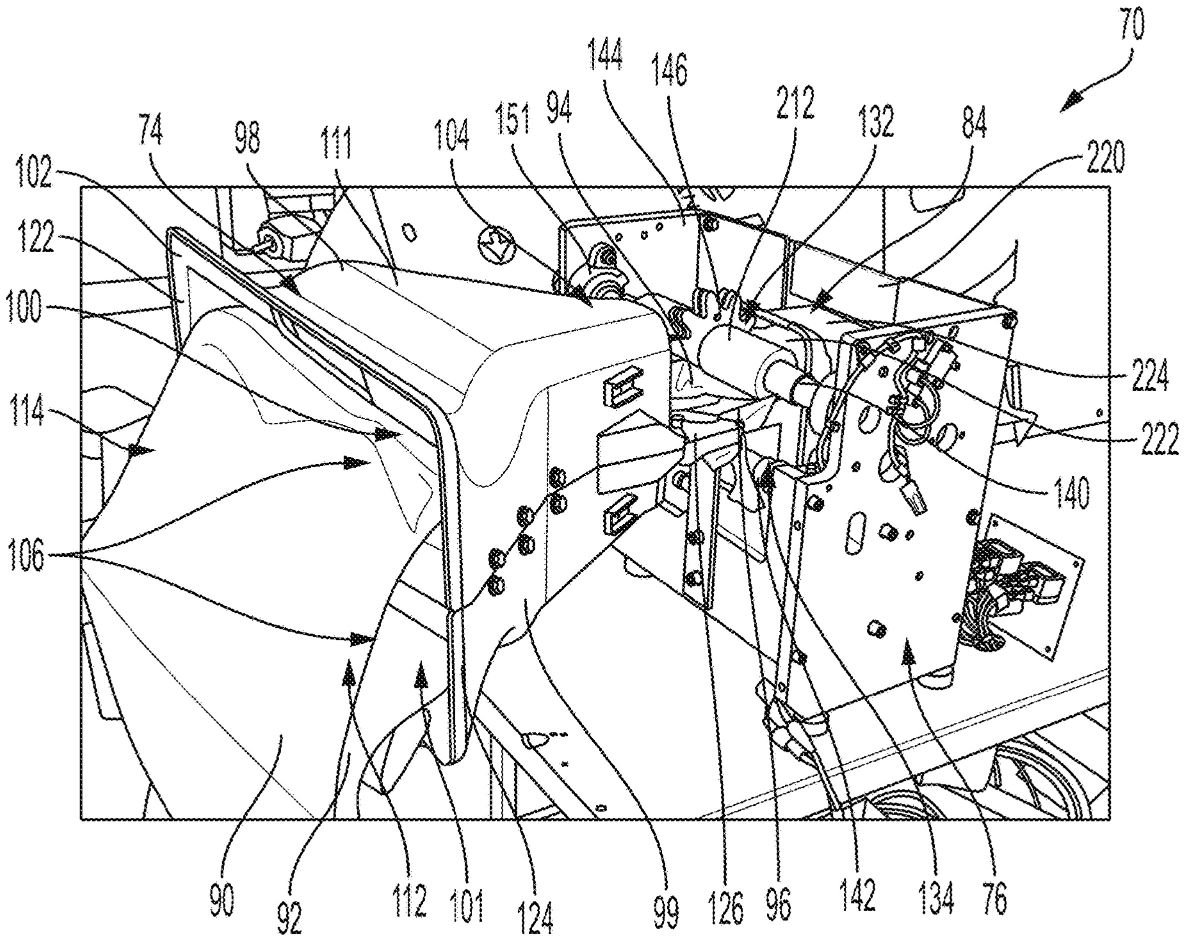
FIG. 4 is a perspective view of an exemplary dunnage conversion machine provided in accordance with the invention.
Figure 5:
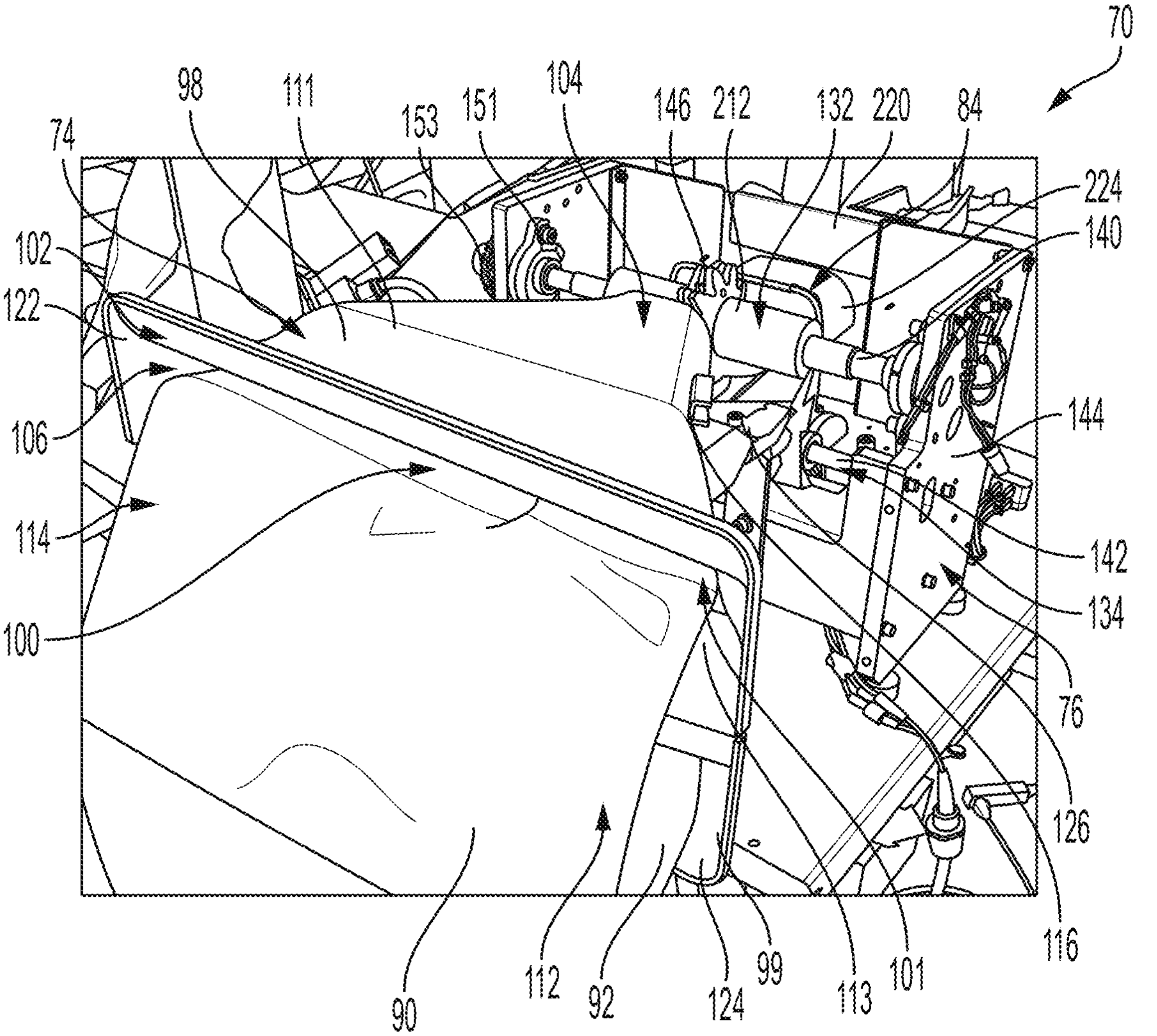
FIG. 5 is another perspective view of the dunnage conversion machine shown in FIG. 4, as seen looking in a downstream direction.

Turning to FIG. 2, an exemplary conversion machine 70 in accordance with the invention is schematically illustrated. The conversion machine 70 converts one or more plies of sheet stock material into a relatively lower density dunnage product, and includes a bunching assembly 74, a feeding assembly 76, an output chute 84, and a severing assembly 86, in sequence.

Referring now to FIGS. 2-12, further details of the exemplary dunnage conversion machine 70 are illustrated. The conversion machine 70 is shown in multiple views and includes the bunching assembly 74, the feeding assembly 76, diverters 77 and 78, the output chute 84, and the severing assembly 86. The bunching assembly 74, the feeding assembly 76, the output chute 84, and the severing assembly 86 are illustrated as arranged in a specific sequence, progressing from an upstream end of the machine 70 to a downstream end of the machine 70. Alternatively, the feeding assembly 76, the output chute 84, and the severing assembly 86 may be arranged in any suitable sequence. For example, while the severing assembly 86 is illustrated as disposed after the output chute 84, the severing assembly 86 could instead be disposed elsewhere upstream or downstream of the feeding assembly 76, such as downstream of the feeding assembly 76 and upstream of the output chute 84.

The bunching assembly 74 is configured to receive sheet material from a supply and to randomly crumple generally planar, two-dimensional plies of sheet stock material, such as plies 90 and 92, which are drawn through the bunching assembly 74. More particularly, the bunching assembly 74 separately randomly crumples each ply 90 and 92 along respective paths into respective three-dimensional modified plies 94 and 96. The illustrated bunching assembly 74 is formed by a pair of converging chutes 98 and 99, each of which defines and bounds a respective separate path 100 and 101 for each ply 90 and 92 of sheet material from an upstream end 102 of the bunching assembly 74 to a downstream end 104 of the bunching assembly 74.

Each chute 98 and 99 includes walls that converge from a relatively larger inlet 106 at the upstream end 102 to a relatively smaller outlet 108 at the downstream end 104. Each chute 98 and 99 inwardly converges in a downstream direction. As shown, side walls 110 inwardly converge in a downstream direction, whereby each chute 98 and 99 has a narrower width dimension at its downstream end 104 as compared to a width dimension at its upstream end 102.

Each chute 98 and 99 also includes upper and lower walls connecting the side walls 110. For example, the upper chute 98 includes an upper wall 111 and a lower wall 113 disposed opposite the upper wall 111. The upper wall 111 is outwardly disposed in respect to a center of the bunching assembly 74, while the lower wall 113 is inwardly disposed in respect to the center of the bunching assembly 74. As shown, the upper wall 111 inwardly converges in the downstream direction towards the lower wall 113 along a distance between the upstream end 102 and the downstream end 104. Conversely, the lower chute 99 includes a lower wall 107 that inwardly converges in the downstream direction towards an upper wall 109 along the distance between the upstream end 102 and the downstream end 104.

The height of the paths 100 and 101, between respective upper and lower walls 107, 109, 111, and 113, and the width of the paths 100 and 101, between the respective side walls 110, decrease over the longitudinal distance from the upstream end 102 to the downstream end 104 of the respective converging chute 98 or 99. Therefore, the inlet 106 of a respective converging chute 98 or 99 has a larger cross-sectional area as compared to the respective outlet 108. Additionally, a downstream width of each path 100 and 101 is narrower than the initial width of the non-crumpled plies 90 and 92, so that the plies 90 and 92 advanced therethrough are inwardly gathered and randomly crumpled. The resultant modified plies 94 and 96 each have a reduced width and increased thickness and occupy a larger volume as compared to the respective uncrumpled plies 90 and 92 from which they are formed.

As shown, the converging chutes 98 and 99 are separate chutes, mirror images of one another, coupled to one another. Alternatively, the chutes 98 and 99 may be integral with one another, and the chutes 98 and 99 may be further spatially separated from one another.

The chutes 98 and 99 are coupled to the feeding assembly 76 by portions 126 of a frame 144 of the conversion machine 70, although they may be attached by any other suitable structure. Both the inlet 106 and the outlet 108 of each chute 98 and 99 are defined by rounded surfaces 122 and 124, which are rounded to help guide the sheet material into a respective chute 98 or 99, to prevent tearing of the sheet stock material, and to facilitate efficient and uninterrupted flow of the sheet stock material into the bunching assembly 74. The paths 100 and 101 generally are parallel, though they may be arranged at separate angles, such as to provide different entrance angles for the plies 90 and 92 from respective supplies, or different exit angles of the modified plies 94 and 96 relative to one another. In the illustrated embodiments, each path 100 and 101 through the bunching assembly 74 between the upstream and downstream ends 102 and 104 completely separated, although any suitable portion of one of the paths 100 or 101 may be open to the other path 100 or 101.

The provision of separate paths 100 and 101 through the converging chutes 98 and 99 for each of the plies 90 and 92 has numerous benefits. The separation encourages each ply to randomly crumple in its own way, thereby minimizing or eliminating nesting of the plies 90 and 92 with each other within or after the bunching assembly 74. Separate crumpling and avoiding nesting facilitates formation of a relatively less dense product as compared to a conventional product formed from joint crumpling, i.e., crumpling not including separate paths through a respective bunching assembly, such as described in U.S. Pat. No. 7,955,245 assigned to Ranpak Corp. of Concord Township, Ohio. Accordingly, the resultant dunnage products formed by the conversion machine 70 have relatively greater cushioning properties.

The conversion machine 70 may further include diverters 77 and 78 upstream of the feeding assembly 76 that minimize overlap and urge the crumpled sheet material out of the path of connecting members in the feeding assembly 76. As further discussed in connection with the feeding assembly 76, this minimizes the material in a portion of the dunnage where the plies are connected together and maximizes the crumpled material available to provide enhanced cushioning properties. Thus, the diverters 77 and 78 encourage separation of a laterally-extending free edge of each individual ply 90, 92, 94, or 96 with another laterally-extending free edge of the same respective ply 90, 92, 94, or 96.

Figure 6:
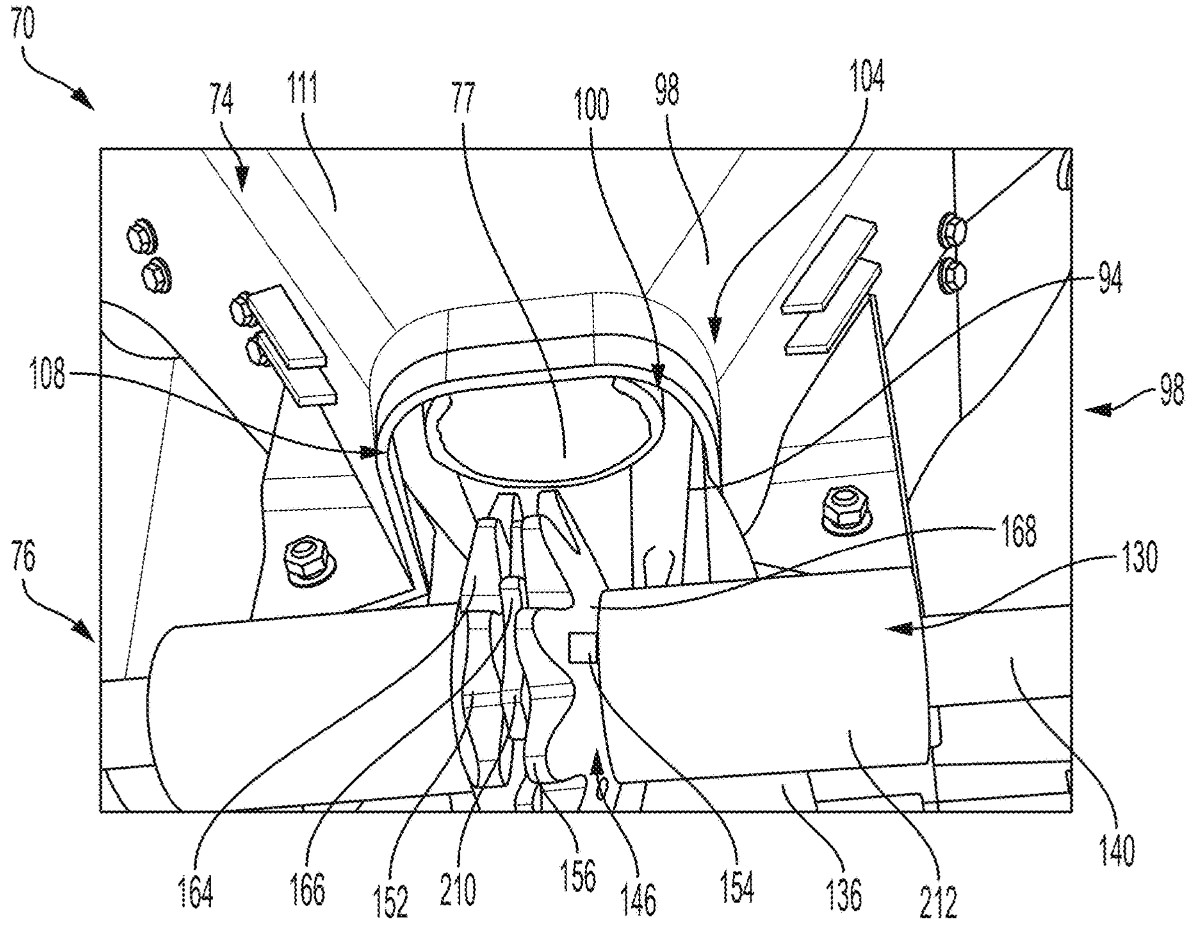
FIG. 6 is a partial perspective view of the dunnage conversion machine shown in FIG. 4, as seen looking in the downstream direction.
Figure 7:
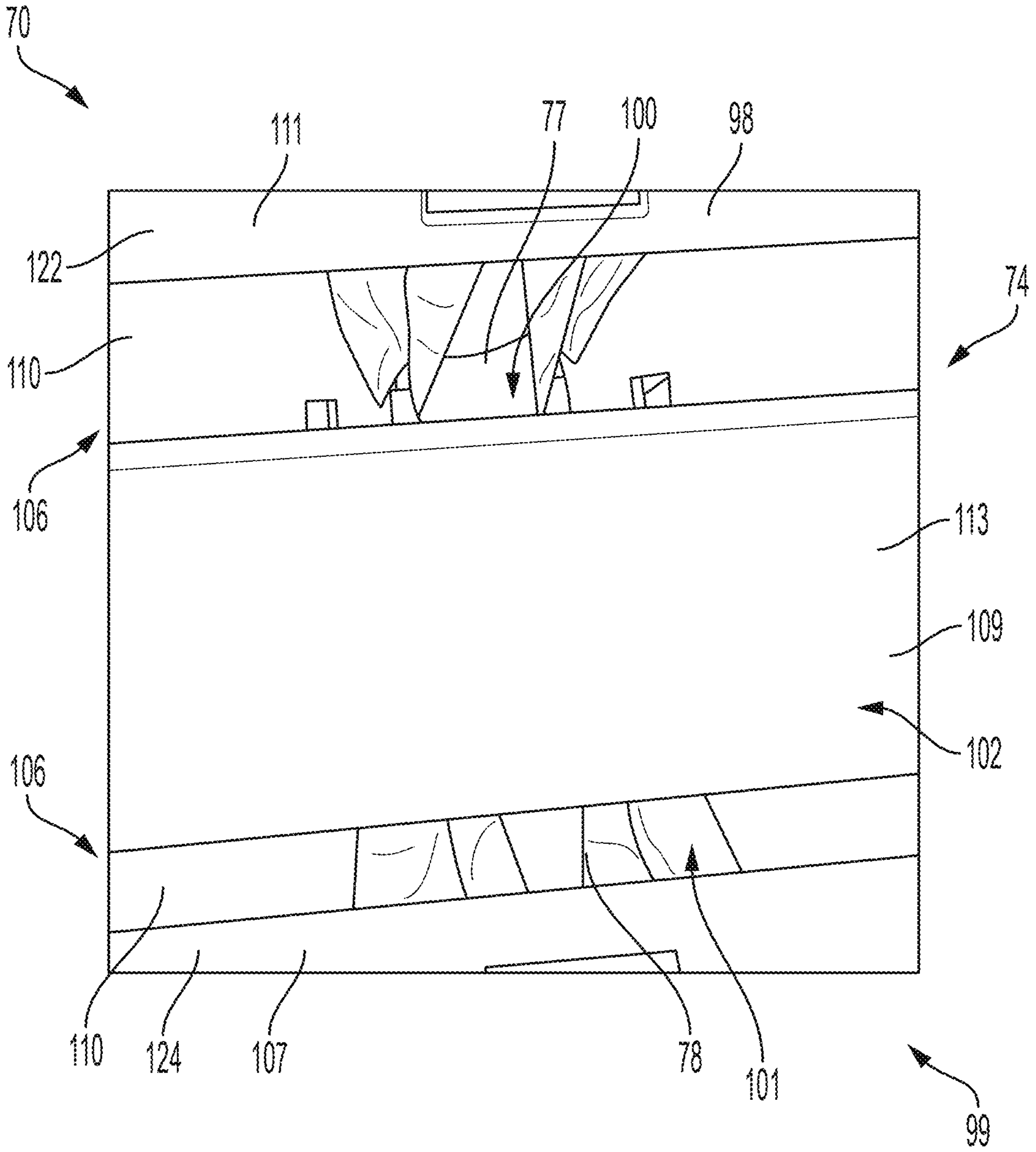
FIG. 7 is a partial downstream elevational view through a bunching assembly of the dunnage conversion machine shown in FIG. 4, as seen looking in the downstream direction.
Figure 8:
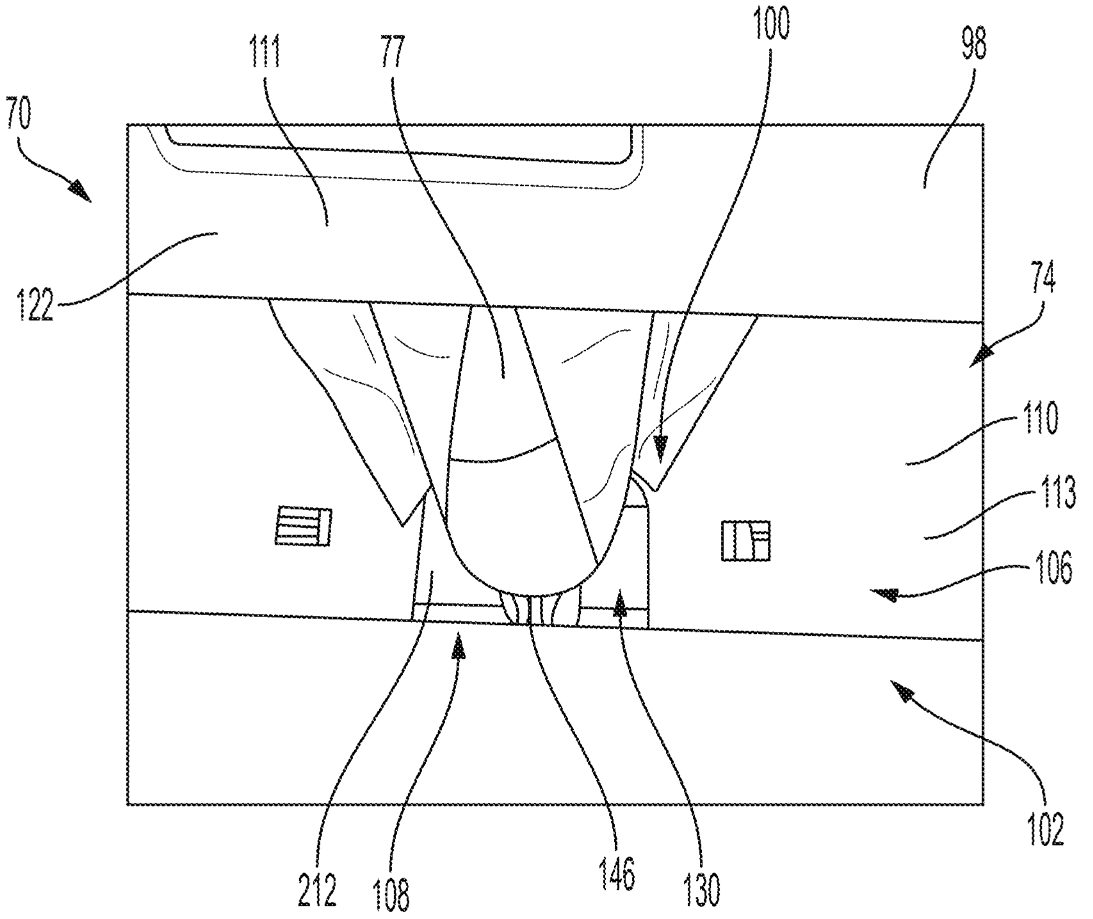
FIG. 8 is another partial downstream elevational view through the bunching assembly of the dunnage conversion machine shown in FIG. 4, as seen looking in the downstream direction.
Figure 9:
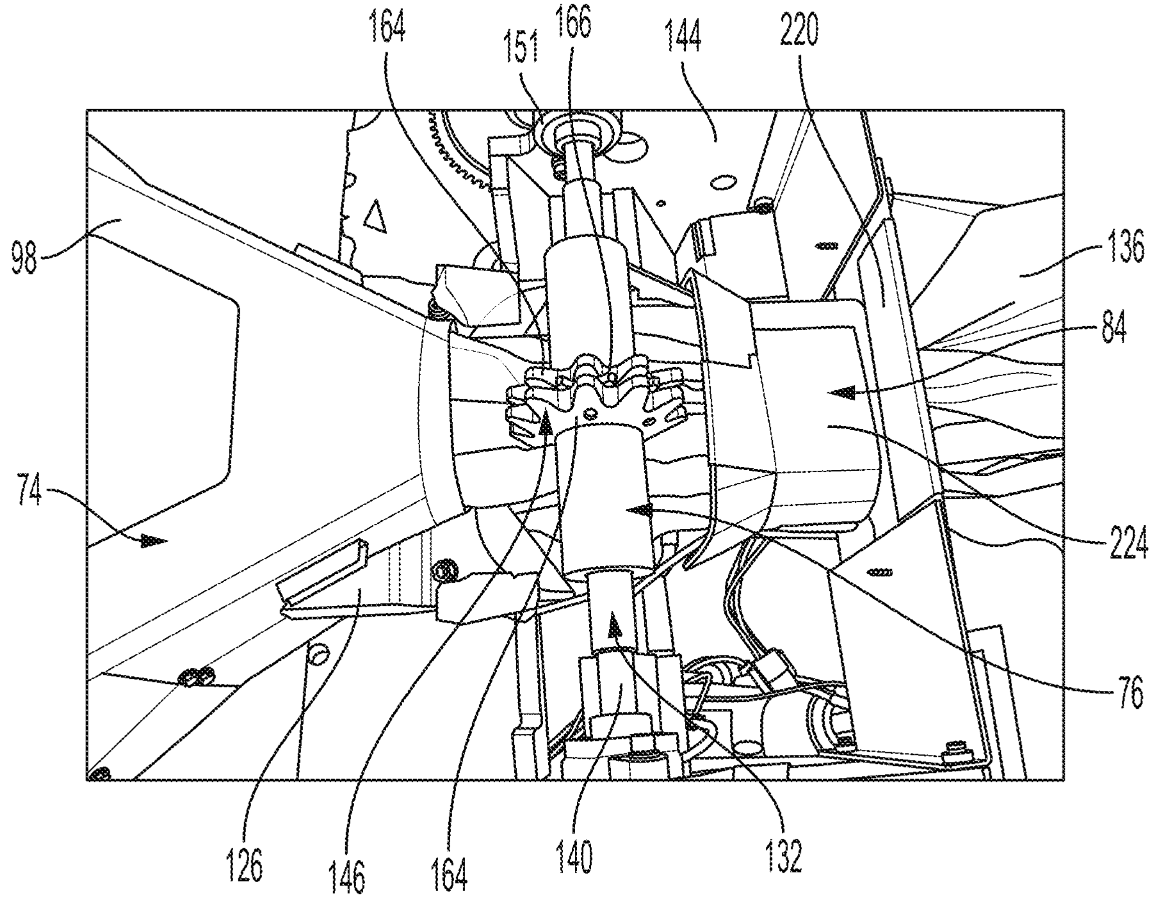
FIG. 9 is a top perspective view of the dunnage conversion machine shown in FIG. 4.
Figure 10:
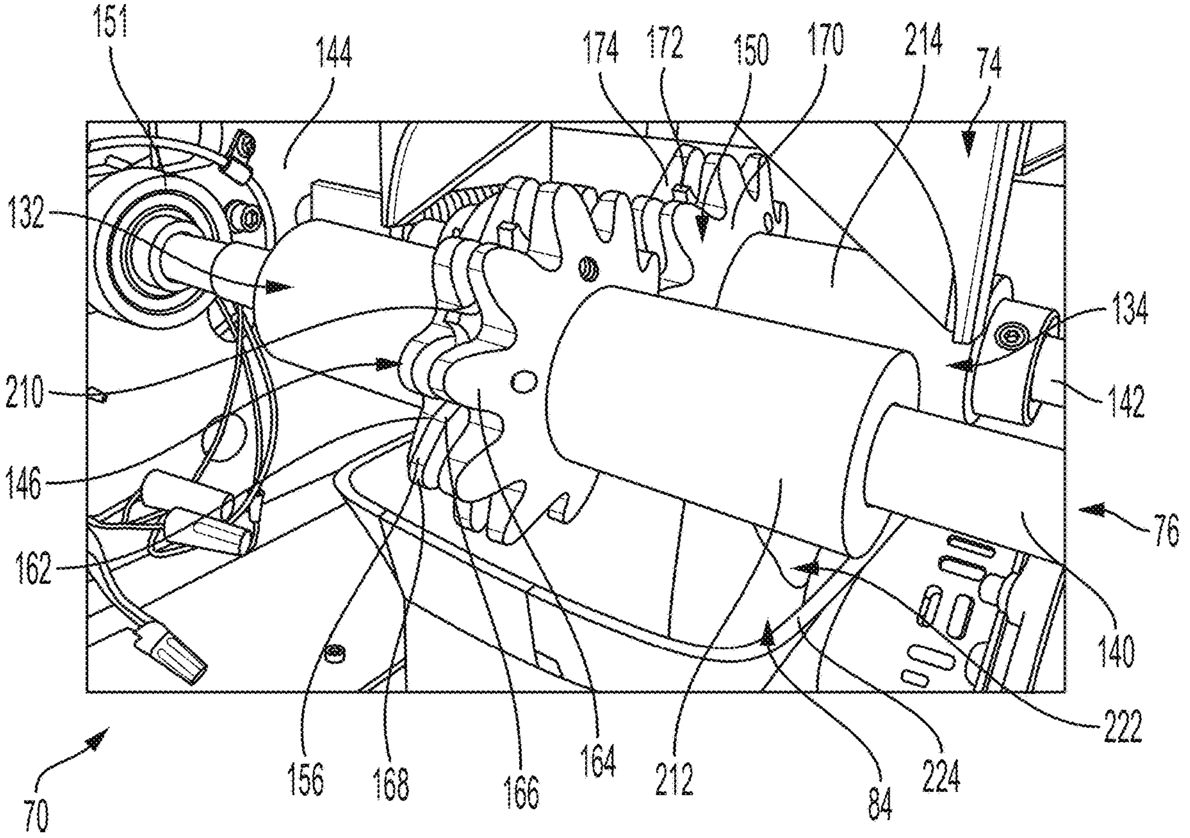
FIG. 10 is a partial perspective view of the dunnage conversion machine shown in FIG. 4, as seen looking in the downstream direction.
Figure 11:
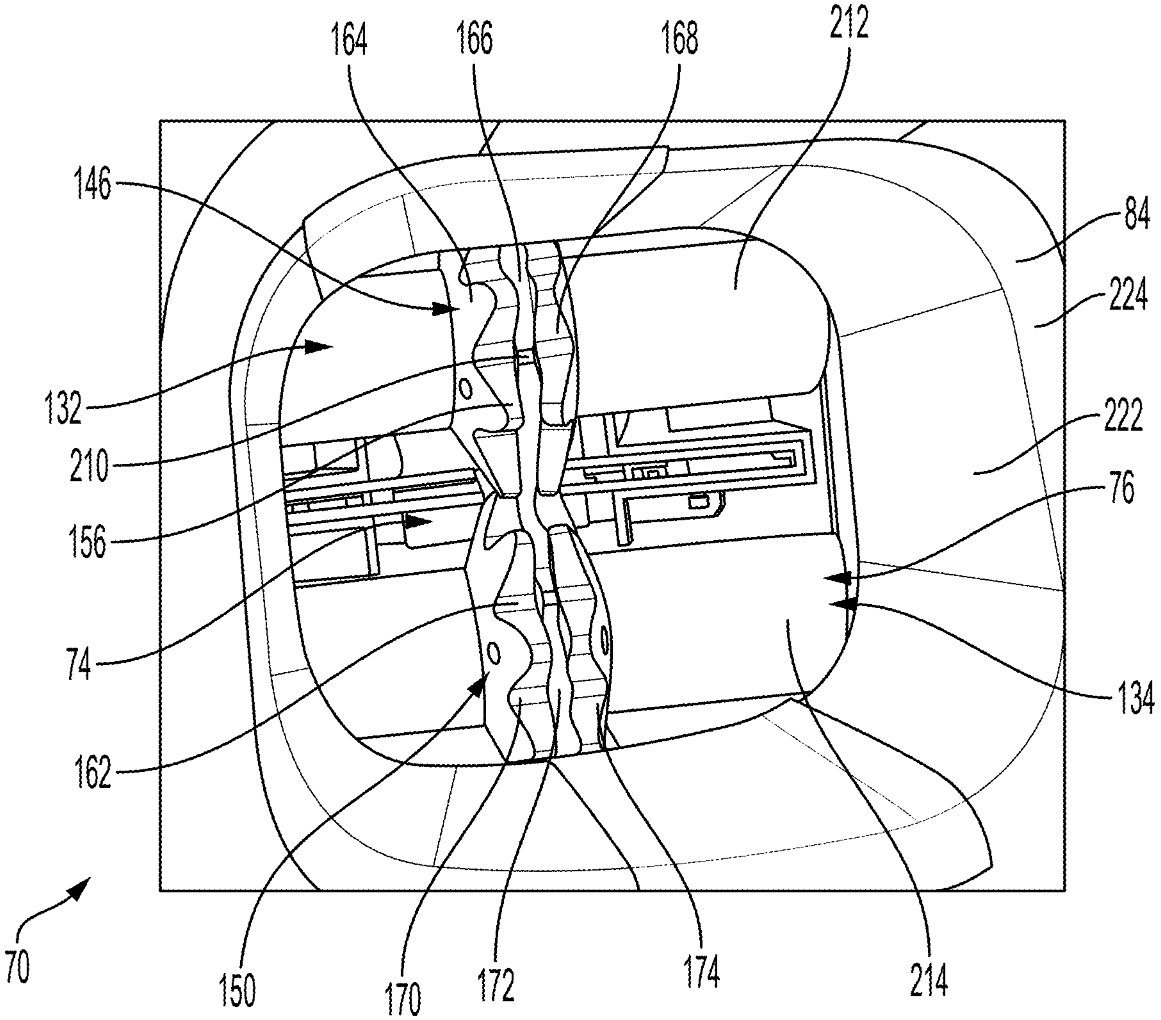
FIG. 11 is a partial upstream elevational view through an output chute of the dunnage conversion machine shown in FIG. 4, as seen looking in an upstream direction, opposite the downstream direction.
Figure 12:
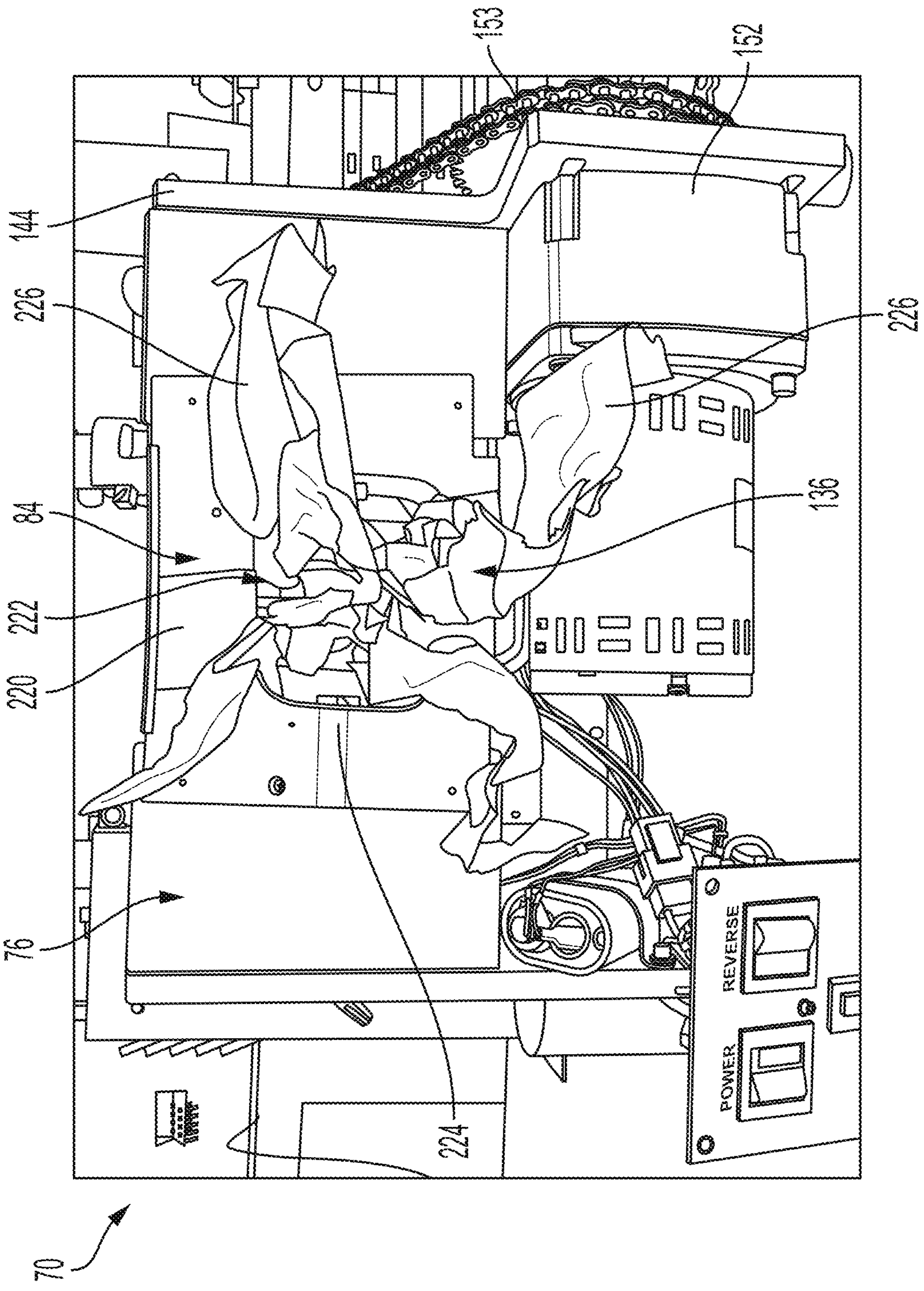
FIG. 12 is another perspective view of the dunnage conversion machine shown in FIG. 4, as seen looking in the upstream direction.
Figure 13:
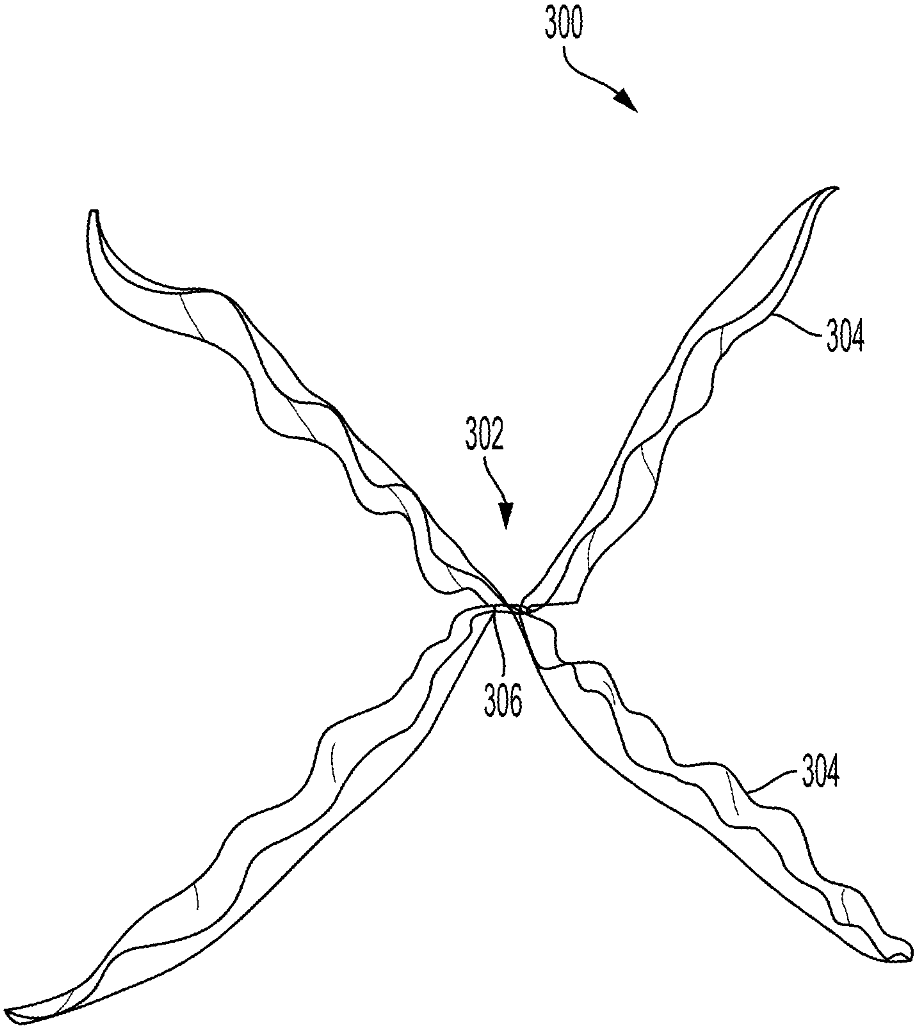
FIG. 13 is a front elevational view of an exemplary dunnage product made by the exemplary conversion machine shown in FIG. 4.
Figure 14:
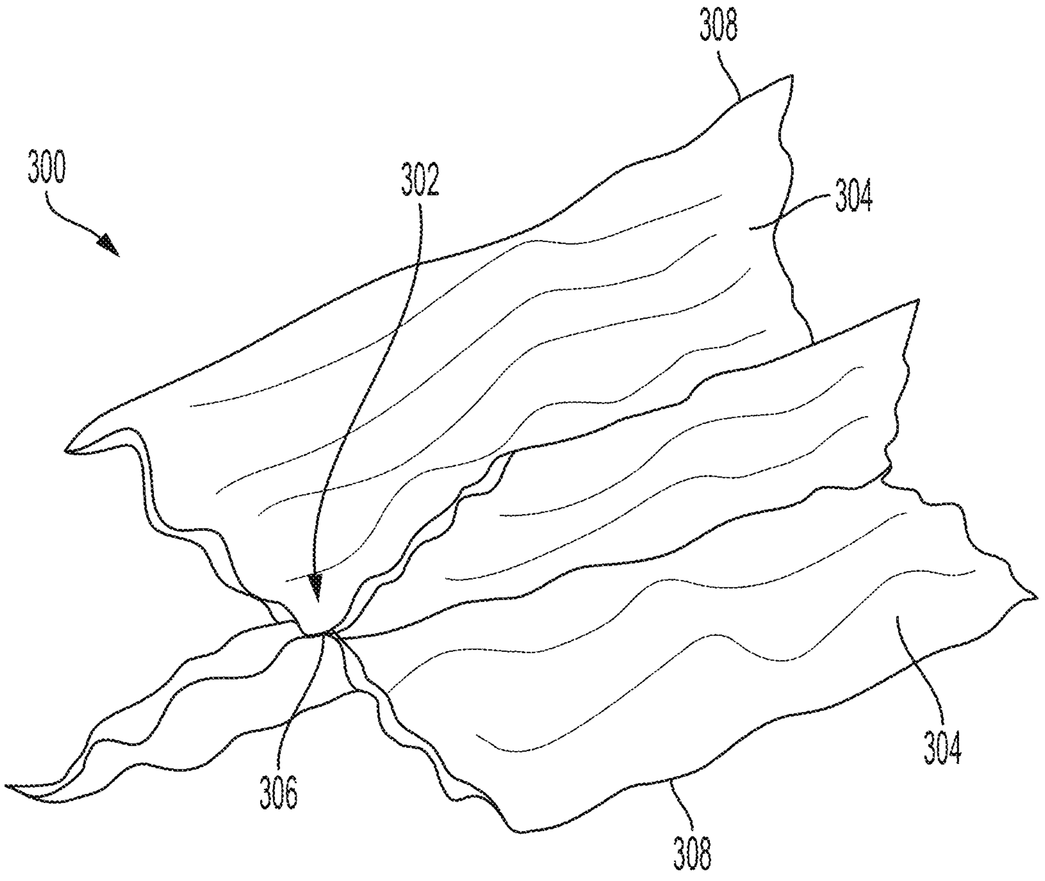
FIG. 14 is a perspective view of the exemplary dunnage product shown in FIG. 13.
Figure 15:
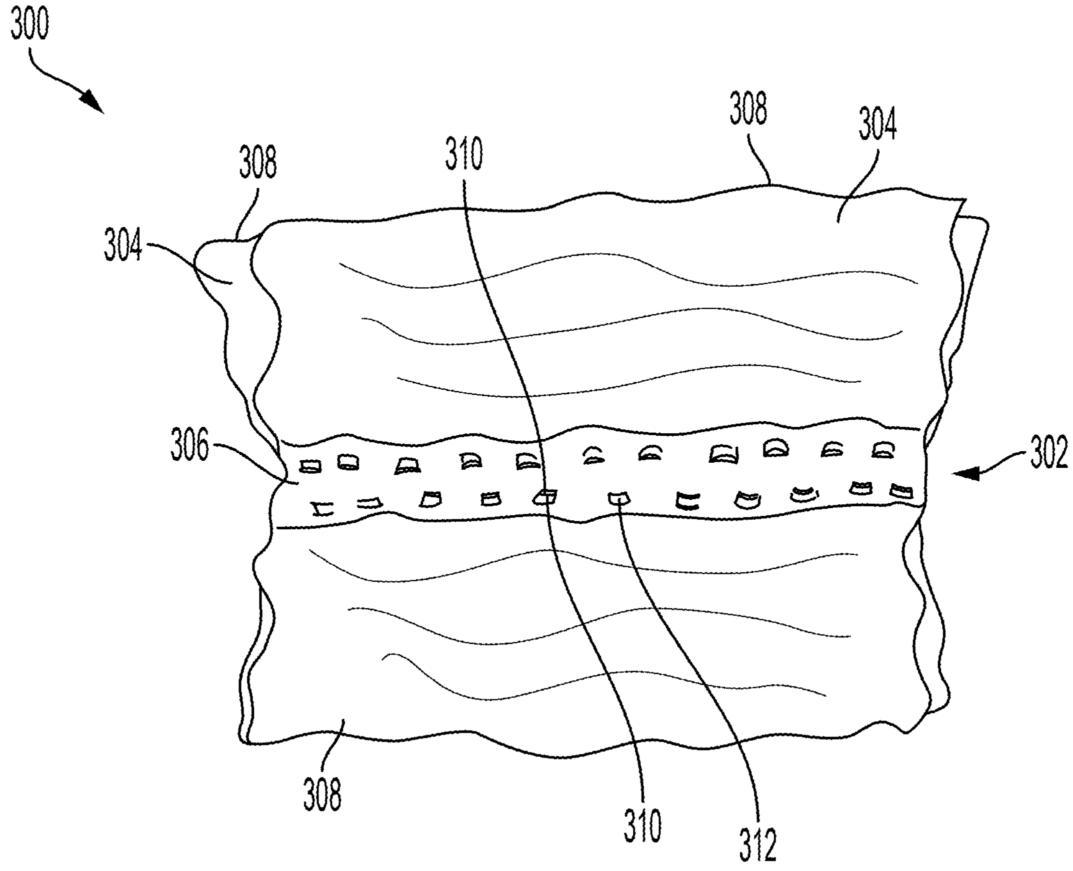
FIG. 15 is a top elevational view of the exemplary dunnage product shown in FIG. 13.
Figure 16:
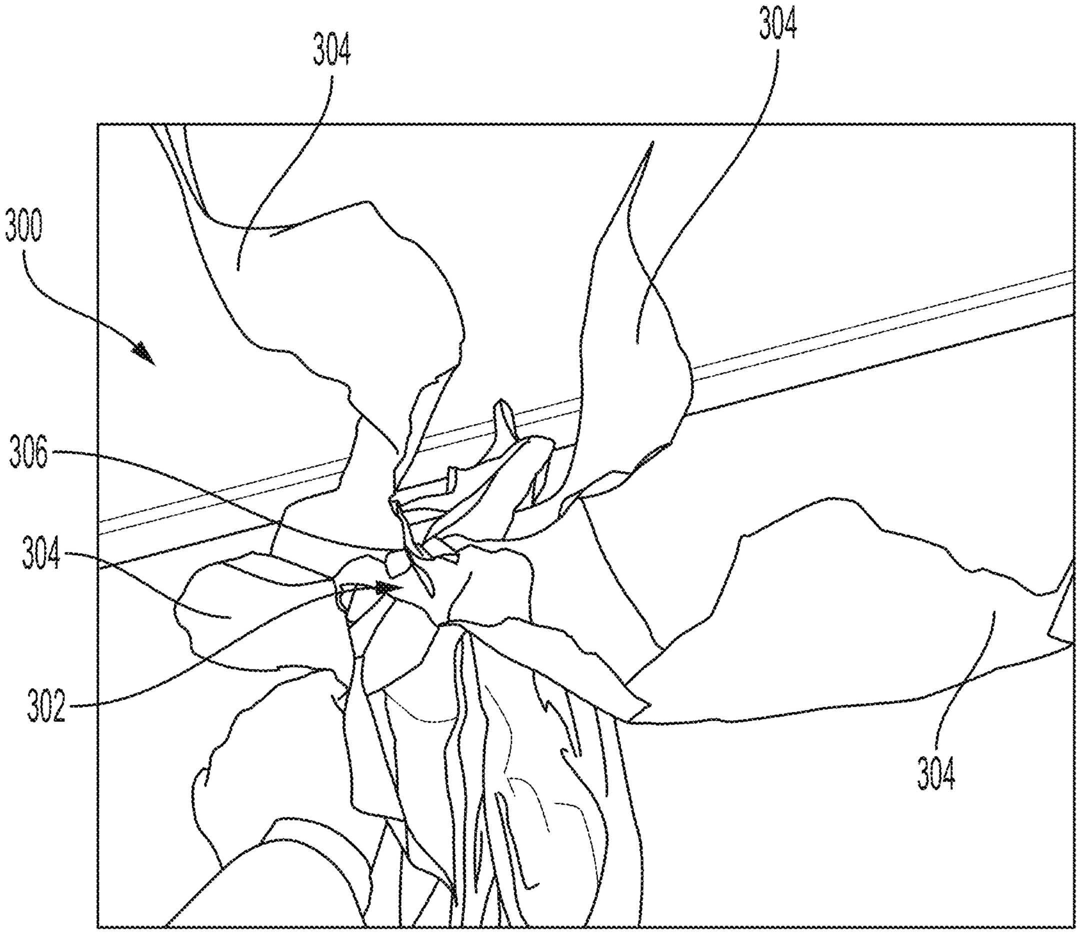
FIG. 16 is another front elevational view of another exemplary dunnage product similar to that shown in FIG. 13.
Figure 17:
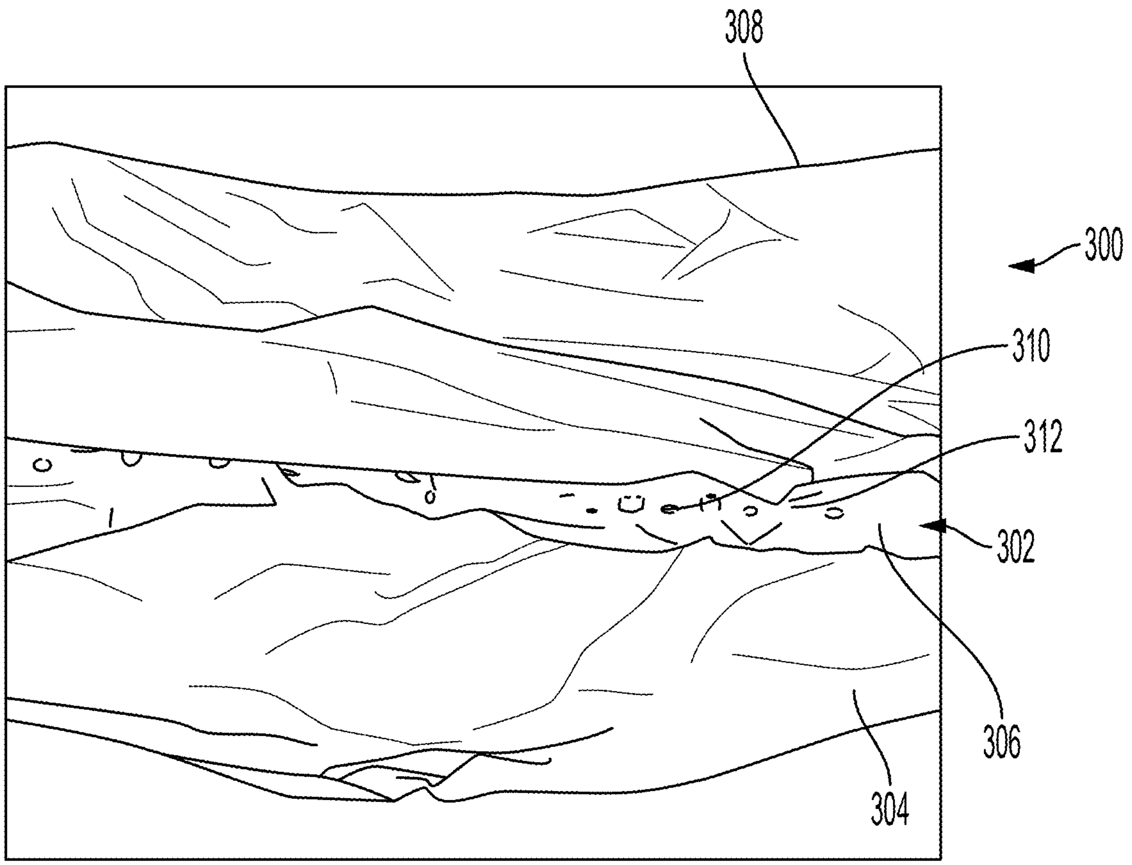
FIG. 17 is another top elevational view of the exemplary dunnage product shown in FIG. 16.
Figure 18:
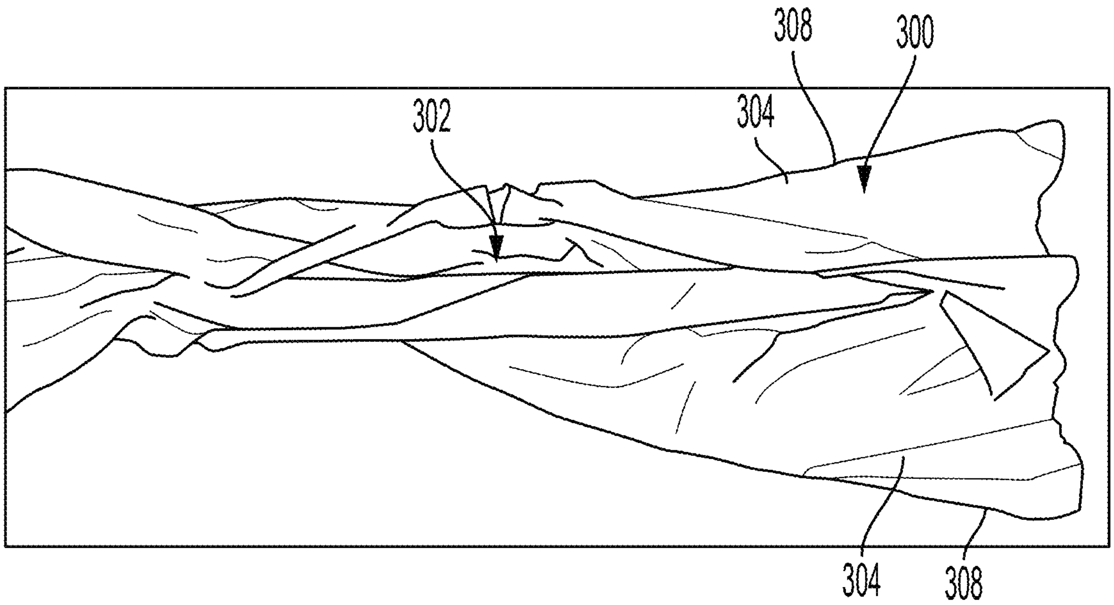
FIG. 18 is a side elevational view of the exemplary dunnage product shown in FIG. 6.

As shown best in FIGS. 6-8, the diverters 77 and 78 extend through at least a portion of the bunching assembly 74 between the respective inlet 106 and outlet 108 of the respective converging chute 98 or 99. Each diverter 77 and 78 is centrally located and extends from an intermediate point, between the respective inlet 106 and outlet 108, to a point generally adjacent the respective outlet 108. Alternatively, one or both of the diverters 77 or 78 may extend along any longitudinal length of the respective chutes 98 and 99 and/or one or both of the diverters 77 or 78 may extend axially from one or both of the respective upstream and downstream ends 102 and 104 of the chutes 98 and 99.

The upper chute 98 includes the diverter 77 and the lower chute 99 includes the diverter 78. The diverter 77 extends at least partially along the upper wall 111 and along the upper path 100, while the diverter 78 extends at least partially along the lower wall 107 and along the lower path 101. The upper diverter 77 is spaced from the lower wall 113 and the lower diverter 78 is spaced from the upper wall 109 to allow the respective plies 90 and 92 to be drawn through the respective chutes 98 and 99 and crumple between the diverter 77 or 78 and the respective adjacent wall of the respective chute 98 or 99.

In one embodiment, the diverters 77 and 78 are separate from the respective chutes 98 and 99 and may be coupled to the chutes 98 and 99 by welding, adhesives, or any other suitable methods. In other embodiments, one or both of the diverters 77 and 78 may be integral with the respective chutes 98 and 99 of the bunching assembly 74. The diverters are illustrated as being generally cylindrical, although the diverters 77 and 78 may have any other shape suitable for urging the sheet material generally outward. Thus free edges of the plies advancing past the diverters 77 and 78 are directed laterally outwardly and away from a center of the plies.

In other embodiments, any number of diverters 77 and 78 may be used, or one or both of the diverters 77 and 78 may include multiple separated or connected segments. For example, any number of additional diverters may be disposed upstream or downstream of the opposed members 132 and 133, such as integral with the output chute 84. In such case, output chute diverters may engage and encourage spreading apart of crumpled edge portions 226 of the dunnage strip 136. One or both of the diverters 77 and 78 may not be present in the conversion machine 70. Thus in some further embodiments only one of the chutes 98 or 99 may include a diverter. Alternatively, the diverters 77 and 78 may not be disposed along the chutes 98 and 99 of the bunching assembly 74, or the diverters 77 and 78 may be disposed adjacent to the bunching assembly 74 and the feeding assembly 76.

As illustrated, the feeding assembly 76 is located adjacent to and downstream of the diverters 77 and 78 and downstream of the bunching assembly 74. The feeding assembly 76 is configured to advance the plies 90 and 92 of sheet material through both the bunching assembly 74 and the feeding assembly 76 and to connect together overlapping portions of the modified plies 94 and 96. Particularly, the feeding assembly 76 includes a pair of opposed members 132 and 134 disposed adjacent and downstream of the diverters 77 and 78 and the bunching assembly 74. The feeding assembly 76 may include additional pairs of opposed members. The opposed members 132 and 134 are arranged to advance and connect together longitudinally-extending overlapped portions of the modified plies 94 and 96 along a line of connection spaced from at least one edge of one of the modified plies 94 and 96 to form a dunnage strip 136.

The upper opposed member 132 and the lower opposed member 134 include respective upper and lower shafts 140 and 142, which are coupled, such as rotatably journaled, to the frame 144. Centrally fixed to each shaft 140 or 142 is a respective stitching member 146 or 150, for rotating in cooperative engagement with the stitching member 146 or 150 fixed to the opposing shaft 140 or 142. The stitching members 146 and 150 cooperate for completing both of the described advancing function and the described connecting function. The upper shaft 140 is journaled in one or more bearings 151 in a side wall of the frame 144. The lower shaft 142, and thus the upper opposed member 132, is spring-biased toward the other shaft and opposed member, and can move away from the other opposed member to allow for different thicknesses of the modified plies 94 and 96 to pass between the opposed members 132 and 134.

Only the upper opposed member 132 is driven, and interengagement between the opposed members 132 and 134 drives rotation of the lower opposed member 134. The lower opposed member 134 is driven by the upper opposed member 132 via contact between the opposed members 132 and 134. The lower opposed member 134 also is driven via frictional contact between the opposed members 132 and 134 and the sheet material interposed between the opposed members 132 and 134. As depicted, the upper opposed member 132 is driven by a prime mover 152 of the conversion machine 70. The prime mover 152 is an electric motor suitably mounted to the frame 144, although the prime mover 152 may any suitable prime mover for driving the opposed members 132 and 134. The prime mover 152 causes the upper shaft 140, and thus the upper opposed member 132, to rotate via a connector, such as a chain 153, extending between the prime mover 152 and the upper shaft 140. In other embodiments, the lower opposed member 134 may be a driven member.

The stitching members 146 and 150 of the opposed members 132 and 134 are fixed to rotate with the respective shafts 140 and 142, for example by using key and slot arrangements, welding, adhesives, or any other suitable methods. Each stitching member 146 and 150, also referred to as stitching gears 146 and 150, is rotatable about a respective axis extending through the respective upper or lower shaft 140 or 142. The stitching members 146 and 150 are arranged to draw the sheet stock material between the stitching member 146 and 150 and to slit and displace a plurality of central portions of the modified plies 94 and 96 passing between the stitching members 146 and 150. The central portions are generally displaced out of a planar configuration of the overlapping plies drawn between the stitching members 146 and 150. Each stitching member 146 and 150 includes a plurality of circumferentially spaced-apart teeth 156 extending from a respective gear center 158. The teeth 156 of the lower stitching member 150 loosely interlace with the teeth 156 of the upper stitching member 146, one of the stitching members 146 or 150 being driven for rotatably driving the other stitching member 150 or 146.

The stitching members 146 and 150 are caused to rotate in opposite directions with respect to one another. As the stitching members 146 and 150 rotate about the respective axes of the shafts 140 and 142, the stitching members 146 and 150 are positioned so that the plurality of teeth 156 of one stitching member 146 or 150 are interlaced sequentially with the plurality of teeth 156 of the other stitching member 146 or 150. Unlike many traditional gears, the stitching members 146 and 150 of the feeding assembly 76 do not interlace tightly, with each gear tooth 156 being closely received in a recess 162 in the opposing gear. Instead the recesses 162 are larger than the corresponding teeth, and this excess space provides what is sometimes called slop. The slop accommodates passage of bunched or extra-thick layers of stock material or differences in the random crumpling between the modified plies 94 and 96. Thus the fit between the teeth 156 of respective stitching members 146 and 150 is relatively loose to accommodate the crumpled plies passing therebetween.

The stitching members 146 and 150 each include a plurality of axially-spaced segments interlacing with one another to advance and to connect the modified plies 94 and 96 therebetween. Each segment represents a slice of the respective gear 146 or 150 perpendicular to its respective rotational axis. As further shown, each gear 146 and 150 has a relatively identical construction and arrangement. The upper gear 146 includes multiple segments 164, 166, and 168, and the lower gear 150 includes multiple segments 170, 172, and 174. The axially-spaced segments are rotatably offset from one another, and the opposed members 132 and 134 are arranged so that the axially-spaced segments 170, 172, and 174 of the lower stitching member 150 interlace with the axially-spaced segments 164, 166, and 168 of the upper stitching member 146.

Each stitching member 146 and 150 has a greater dimension parallel to its rotational axis and adjacent the rotational axis than at a peripheral extent of the teeth 156. Referring briefly to the lower stitching member 150, axially-outer segments 170 and 174 have a wedge-like shape. The wedge-like shape includes a thicker dimension in a central portion of the stitching member 150 adjacent the axis, and a relatively thinner dimension at an outer periphery or the peripheral extent of the teeth 156. The inner or center segment 172 between the axially-outer segments 170 and 174 is generally planar and serves as a an axial slitting segment of the stitching member 150 to slit and displace portions of the modified plies 94 and 96 out of its planar configuration, thereby connecting the plies 94 and 96 to one another. The wedge shape of the stitching member 150 may encourage the modified sheet stock material adjacent the stitching member 150 to be pushed outward rather than passing between the stitching members 146 and 150, thereby further minimizing the amount of sheet material being compressed.

At least one axially-bounded inner segment 166 or 172 of at least one of the stitching members 146 or 150 has shorter, narrower teeth 210 that are rotationally offset relative to the teeth 156 of the respective outer segments 164, 168, 170, and 172. These teeth 210 may be squared off at their distal ends. Accordingly, as the longer teeth 156 of the outer segments 170 and 172 of the stitching member 150 press sheet stock material toward the center of the opposed stitching member 146, a tooth 210 of the center segment 172 presents its sharp, squared-off edges to the sheet stock material, e.g., the modified plies 94 and 96. The edges of the teeth 210 of the center segment 172 create a pair of parallel slits in the sheet stock material and tab portions, also referred to as tabs, between the slits. And as the teeth 156 of the outer segments 170 and 174 push the sheet material outside the slits in one direction, the teeth 210 of the center segment 166 of the opposed upper stitching member 146 push the sheet material of the tabs between the slits in an opposite direction. The stitching members 146 and 150 thus cooperate to displace the sheet material of the tab between the slits relative to the sheet material adjacent to and outside the slits.

Unlike some conventional prior feeding/connecting gears, both of the stitching members 146 and 150 form tabs. Thus, the tabs are displaced on both sides of the dunnage strip 136, in opposed directions about a central plane generally extending through the generally planar line of connection. The stitching members 146 and 150 form a pair of intermittent, regularly-spaced pairs of parallel slits in the sheet stock material. Central portions between the slits, i.e. the tabs, are displaced with respect to the central plane generally extending through the generally planar line of connection. In other embodiments, additional rows of slits and tabs in the dunnage strip 136 may be added by including additional axially-spaced segments, thereby further enhancing the connecting function of the feeding assembly 76.

The feeding assembly 76 of the machine 70 stitches the line of connection of the dunnage strip 136 over a relatively narrow area. This process leaves relatively larger laterally-extending crumpled edge portions 226 to provide relatively increased cushioning, rather than having lateral edges of the plies stamped down and/or compressed in a central connecting portion as is done in conventional conversion machines.

The tab portions between the slits include layers of each of the modified plies 94 and 96 because the modified plies 94 and 96 are affected simultaneously. Friction between the edges of the sheet material in each respective tab, relative to the sheet material adjacent the slits, tends to connect edges of the respective tab. Similarly, friction between sheet material adjacent the tabs, forming the slits, also tends to hold the pieces together. Overlapped central longitudinally-extending portions of the layers of sheet material thus are interconnected together, such as interlocked together, forming a longitudinally-extending line of connection that includes the slits and the tabs.

The longitudinally-extending line of connection of the dunnage strip 136 is formed between oppositely disposed lateral edges of the modified plies 94 and 96. The line of connection is relatively planar as compared to the randomly crumpled state of the lateral edges. The line of connection is centrally disposed between the lateral edges, and thus includes central longitudinally-extending overlapped portions of the modified plies 94 and 96. Alternatively, the line of connection may be spaced relatively closer to one lateral edge than the other, depending on the desired shape or cross-sectional profile of the resultant dunnage strip 136 while leaving at least one edge of each ply free, thereby enhancing the cushioning and void-filling properties of the dunnage. The free edges give the dunnage strip a unique X-shape cross-section.

The configuration of the dunnage strip 136 may be further controlled via other optional feeding assembly components.

For example, separate advancing shafts (not shown) may be provided operatively coupled to and adjacent the opposed members 132 and 134. In such case, the separate advancing shafts may be driven at the same rate as the opposed members 132 and 134, thereby minimizing longitudinal crumpling or bunching of the modified plies 94 and 96 therebetween due to differences in driving rates. On the other hand, the separate advancing rollers may be driven at a different rate than the opposed members 132 and 134, to provide additional random longitudinal crumpling to the modified plies 94 and 96 to vary the density of the dunnage product and its resulting cushioning properties, or to potentially separate distinct dunnage products from the dunnage strip 136.

The opposed members 132 and 134 also may include the illustrated cylindrical members 212 and 214, for guiding the laterally-extending edges of the modified plies 94 and 96 past the shafts 140 and 142 on which the stitching members 146 and 150 are mounted. The cylindrical members 212 and 214 are shown spaced axially adjacent the respective upper and lower stitching members 146 and 150. One cylindrical member 212 or 214 is spaced on each side of each respective stitching member 146 or 150 effectively increasing the diameter of the shaft 140 or 142 on which it is mounted. With this configuration the laterally-extending edges of the modified plies 94 and 96 may be more effectively guided towards the output chute 84 disposed downstream of the opposed members 132 and 134 and the feeding assembly 76.

The output chute 84 defines a path that guides the dunnage strip 136 away from the conversion machine 70 while circumferentially constraining the continuous dunnage strip 136. The output chute 84 is coupled to an end plate 220, which is in turn coupled to the frame 144 via any suitable coupling. In the illustrated embodiments, the output chute 84 includes an aperture 222 defined by a longitudinally-extending portion 224. The portion 224 of the chute 84 may be rounded to prevent or minimize tearing in the strip of dunnage 136. As illustrated, the portion 224 receives the interconnected dunnage strip 136 and is sized to at least partially circumferentially constrain the laterally-extending edges of the X-shaped dunnage strip 136. Friction between the chute walls and the dunnage strip 136 may enhance further longitudinal crumpling before the strip 136 exits the machine 70, and may facilitate connecting the overlapping plies 94 and 96 or severing discrete dunnage products from the strip 136.

The continuous dunnage strip 136 may be separated or severed to provide distinct dunnage products of a desired length by an optional severing assembly 86. The severing assembly 86 may include one or more cutting members, which may be actuated manually or automatically. An exemplary severing assembly is described in U.S. Pat. No. 4,699,609 to Ranpak Corp. of Concord Township, Ohio.

In some situations, the severing assembly 86 may be omitted altogether, such as when discrete lengths of sheet material are supplied to the feeding assembly 76. Another alternative is to employ a sheet stock material that is perforated across its width so that a length of dunnage product can be torn from the dunnage strip 136. The perforations can be formed in the stock material before being supplied to the dunnage conversion machine 70 or formed as part of the conversion process. Additionally or alternatively, the conversion machine 70 may be configured to automatically separate a desired length of dunnage product from dunnage strip made of perforated stock material. This can be accomplished by providing a second set of rotating members upstream or downstream of the opposed members 132 and 134, and stopping whichever set is upstream, while continuing to feed sheet material through the downstream seat of rotating members.

Turning now to FIGS. 13-18, the present invention also provides a unique exemplary dunnage product 300 that includes one or more plies of sheet stock material in an interconnected configuration having an X-shaped cross-sectional profile. The dunnage product 300 is formed by a dunnage conversion machine, such as the exemplary dunnage conversion machines described above, and includes an interconnected central portion 302 and lateral, crumpled, cushioning, edge portions 304 generally adjacent the central portion 302. As illustrated, the central portion 302 is centrally-disposed between oppositely disposed, crumpled, edge portions 304 that are separated from one another. Edge portions 304 of different plies are separated from one another outside the central portion 302, in addition to opposed edge portions 304 of each individual ply being separated from one another.

Particularly, two or more plies of sheet stock material are converted into an interconnected configuration including the interconnected central portion 302, which is a longitudinally-extending portion having interconnected overlapped portions of each of the plies and a longitudinally-extending line of connection 306. Each ply extends laterally outwardly along the randomly crumpled edge portions 304 from the line of connection 306 to opposed, laterally-extending free edges 308 of the edge portions 304. The lateral edge portions 304 are longitudinally-coextensive, laterally-extending, edge portions 304 randomly crumpled and spread apart from one another. Because of the separate random crumpling of each ply, the pattern of folds in the edge portions 304 is random and generally not repeated in other plies or portions of plies, thereby minimizing nesting and maximizing the loft and cushioning properties of the resulting dunnage product 300. The edge portions 304 generally are adjacent the line of connection 306 in the longitudinally-extending central portion 302. Each of the crumpled edge portions 304 of each ply has a crumpled lateral width that is greater than a lateral width of the longitudinally-extending portion 302. The free edges 308 of each individual ply typically are separated from the free edges 308 of the other plies.

As generally described above, the conversion process includes randomly crumpling lateral edge portions of generally planar plies of a two-dimensional sheet stock material, while encouraging separation of the edge portions from one another, thereby forming the crumpled edge portions 304 having the laterally-extending free edges 308. During a connecting process, overlapped central portions of randomly crumpled plies are connected together along the line of connection 306 to form the longitudinally-extending central portion 302. The line of connection 306 is relatively planar as compared to the randomly crumpled state of the lateral free edges 308. The line of connection 306 is longitudinally, centrally disposed between the oppositely disposed free edges 308. Alternatively, the line of connection 306 may be spaced relatively closer to one lateral edge 308 than others, depending on the desired shape or cross-sectional profile of the resultant dunnage product 300.

As shown, the line of connection 306 includes slits 310 extending through the overlapped portions of each of the plies, and also includes portions adjacent the slits being displaced to interconnect the overlapped portions. The slits 310 are spaced apart periodically and longitudinally, and are aligned in rows of slits 310, such as two parallel rows, thereby forming tabs 312 in between. Any suitable number of rows of slits 310 and tabs 312 may be present.

The tabs 312 are displaced out of a generally planar configuration of the line of connection 306. Frictional engagement and the displacement of the tabs 312 holds the sheet stock material of the dunnage product 300 in its interconnected configuration. The slits 310 also have frictionally engaged edges to provide additional interconnecting. The tabs 312 are displaced in alternating opposed directions about a central plane generally extending through the line of connection 306.

In summary, a dunnage conversion machine 70 includes a bunching assembly 74 that randomly crumples at least the plies 90 and 92 of sheet stock material into modified plies 94 and 96 having three-dimensional shape, and a feeding assembly 76 that advances and connects together longitudinally-extending portions of the modified plies 94 and 96 to form a dunnage strip 136. Diverters 77 and 78 minimize overlap of and encourage separation of lateral edges of the modified plies from one another, and a severing assembly 86 severs distinct dunnage products from the strip 136. An exemplary resultant dunnage product 300 includes two or more plies of crumpled sheet material interconnected along a longitudinally-extending portion 302 having interconnected overlapped portions of each of the plies and a longitudinally-extending line of connection 306. Each ply may extend laterally outwardly along randomly crumpled edge portions 304 having a crumpled lateral width greater than a lateral width of the longitudinally-extending portion 302, the edge portions 304 extending from the line of connection 306 to opposed, laterally-extending free edges 308.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

What is claimed is:

1. A method of converting sheet stock material into a dunnage product, the method comprising the steps of:

providing multiple separate plies of sheet stock material that are independent of and unconnected with each other, each ply having a generally planar shape;

advancing the separate plies of sheet stock material along separate respective paths;

while advancing the separate plies of sheet stock material along the separate respective paths, randomly crumpling each of the plies of sheet stock material while the separate plies are not in contact with each other on their respective paths to form modified plies, each modified ply having a generally three-dimensional shape and laterally-extending crumpled edge portions;

connecting the modified plies together along longitudinal portions thereof, after each ply has been converted into the generally three-dimensional shape, to form a dunnage strip; and after the connecting step, separating one of the laterally-extending crumpled edge portions of one of the plies from another one of the laterally-extending crumpled edge portions of another one of the plies to form a continuous dunnage product having an X-shape cross-section.

2. A method as set forth in claim 1, further including the step of minimizing overlap of one of the laterally-extending crumpled edge portions of one of the plies with another laterally-extending crumpled edge portions of another one of the plies.

3. A method as set forth in claim 1, wherein the advancing step includes drawing the separate plies of sheet stock material between rotating opposed members.

4. A method as set forth in claim 1, wherein the connecting step includes slitting and displacing portions of the modified plies out of a planar configuration, thereby forming a longitudinally-extending line of connection spaced from free edges of the laterally-extending crumpled edge portions of the modified plies.

5. A method as set forth in claim 1, further including the step of circumferentially constraining the laterally-extending crumpled edge portions of the dunnage strip after the connecting step.

6. A method as set forth in claim 1, further including the step of severing distinct dunnage products from the dunnage strip.

7. A dunnage product having an X-shape cross section produced by the method of claim 1.

8. A method of converting sheet stock material into a dunnage product, the method comprising the steps of:

providing multiple separate plies of sheet stock material that are independent of each other, each ply having a generally planar shape;

advancing the separate plies of sheet stock material along separate respective paths;

while advancing the separate plies of sheet stock material along the separate respective paths, randomly crumpling each of the plies of sheet stock material to form modified plies, each modified ply having a generally three-dimensional shape and laterally-extending crumpled edge portions;

connecting the modified plies together along longitudinal portions thereof, after each ply has been converted into the generally three-dimensional shape, to form a dunnage strip; and after the connecting step, separating one of the laterally-extending crumpled edge portions of one of the plies from another one of the laterally-extending crumpled edge portions of another one of the plies to form a continuous dunnage product having an X-shape cross-section;

wherein the separately randomly crumpling step includes drawing each of the generally planar plies through a separate chute, where each chute has converging side walls.

* * * * *